United States Patent
Bray et al.

(10) Patent No.: US 7,480,534 B2
(45) Date of Patent: Jan. 20, 2009

(54) COMPUTER ASSISTED LIGHTING CONTROL SYSTEM

(75) Inventors: Richard A. Bray, Birmingham, AL (US); Michael Grant, Birmingham, AL (US); William P. Horton, Birmingham, AL (US)

(73) Assignee: The Watt Stopper, Santa Clara, CA (US)

( * ) Notice: Subject to any disclaimer, the term of this patent is extended or adjusted under 35 U.S.C. 154(b) by 230 days.

(21) Appl. No.: 11/131,776

(22) Filed: May 17, 2005

(65) Prior Publication Data

US 2006/0262086 A1 Nov. 23, 2006

(51) Int. Cl.
  *G05B 11/01* (2006.01)
(52) U.S. Cl. ........................................... 700/19
(58) Field of Classification Search ............. 700/19–20, 700/58, 59, 60, 65, 66, 56; 40/442, 443, 40/463; 362/35; 340/932, 956, 982, 641
See application file for complete search history.

(56) References Cited

U.S. PATENT DOCUMENTS

| | | | | |
|---|---|---|---|---|
| 4,484,295 A * | 11/1984 | Bedard et al. | ................... | 708/8 |
| 4,644,547 A * | 2/1987 | Vercellotti et al. | .......... | 709/236 |
| 5,621,662 A * | 4/1997 | Humphries et al. | ......... | 700/276 |
| 5,623,531 A * | 4/1997 | Nilssen | ....................... | 379/56.2 |
| 5,661,802 A * | 8/1997 | Nilssen | ....................... | 380/240 |
| 5,962,989 A | 10/1999 | Baker | ......................... | 315/294 |
| 6,034,581 A * | 3/2000 | DiMarco et al. | .............. | 335/16 |
| 6,073,003 A * | 6/2000 | Nilssen | ....................... | 455/402 |
| 6,297,724 B1 * | 10/2001 | Bryans et al. | .............. | 340/3.51 |
| 6,353,853 B1 | 3/2002 | Gravlin | ....................... | 709/219 |
| 6,713,975 B2 * | 3/2004 | Yamauchi et al. | ........... | 315/308 |
| 6,782,309 B2 * | 8/2004 | Laflamme et al. | ........... | 700/275 |
| 6,894,609 B2 | 5/2005 | Menard et al. | .............. | 340/531 |
| 7,024,256 B2 * | 4/2006 | Krzyzanowski et al. | ....... | 700/65 |
| 7,027,878 B2 * | 4/2006 | Bennett | ....................... | 700/14 |
| 7,089,089 B2 * | 8/2006 | Cumming et al. | ........... | 700/295 |
| 7,099,723 B2 * | 8/2006 | Gonzales et al. | ............. | 700/87 |
| 7,122,976 B1 * | 10/2006 | Null et al. | .................... | 315/362 |
| 7,277,012 B2 * | 10/2007 | Johnston et al. | .......... | 340/545.4 |

(Continued)

OTHER PUBLICATIONS

Virtual versus real design of a traffic light/voice controller Daum, P.; Fukuda, B.; Jensen, N.; Hancock, G.; Ciubotariu, C.; Information Technology Based Higher Education and Training, 2005. ITHET 2005. 6th International Conference on Jul. 7-9, 2005 pp. T2C/12-T2C/16 Digital Object Identifier 10.1109/ITHET.2005.1560235.*

(Continued)

*Primary Examiner*—Michael B. Holmes
(74) *Attorney, Agent, or Firm*—James A. Gavney, Jr.

(57) ABSTRACT

Automatic lighting control systems, devices, and methods that automatically control a light source in response to detected computer usage by a user are disclosed. The automatic lighting control method comprises monitoring usage of a computer and controlling an output of a light based on the usage. The system comprises a computer configured to detect usage of the computer by a user, a central server, a lighting controller unit, and a light source that is controlled based on the usage of the computer. The usage is selected from the group consisting of a key stroke, a mouse movement, a use of a peripheral device operatively coupled to the host computer, and any combination thereof.

33 Claims, 4 Drawing Sheets

U.S. PATENT DOCUMENTS

| | | | |
|---|---|---|---|
| 2002/0047774 A1* | 4/2002 | Christensen et al. | 340/3.54 |
| 2003/0001577 A1 | 1/2003 | Baldwin et al. | 324/418 |
| 2003/0050737 A1* | 3/2003 | Osann, Jr. | 700/276 |
| 2004/0003051 A1* | 1/2004 | Krzyzanowski et al. | 709/217 |
| 2004/0160199 A1 | 8/2004 | Morgan et al. | 315/312 |
| 2004/0260407 A1* | 12/2004 | Wimsatt | 700/19 |
| 2004/0260427 A1* | 12/2004 | Wimsatt | 700/275 |
| 2005/0097162 A1* | 5/2005 | Budike, Jr. | 709/201 |
| 2005/0105296 A1* | 5/2005 | French | 362/485 |
| 2005/0116667 A1 | 6/2005 | Mueller et al. | 315/312 |
| 2005/0128751 A1 | 6/2005 | Roberge et al. | 362/276 |
| 2005/0138142 A1* | 6/2005 | Crookham et al. | 709/217 |
| 2005/0280388 A1* | 12/2005 | Evanyk | 318/471 |
| 2006/0166620 A1* | 7/2006 | Sorensen | 455/41.1 |
| 2006/0197471 A1 | 9/2006 | Chitta | 315/291 |
| 2006/0213997 A1* | 9/2006 | Frank et al. | 235/462.15 |
| 2006/0230270 A1* | 10/2006 | Goffin | 713/173 |

OTHER PUBLICATIONS

An integrated control system for optimizing the energy consumption and user comfort in buildings Pargfrieder, J.; Jorgl, H.P.; Computer Aided Control System Design, 2002. Proceedings. 2002 IEEE International Symposium on Sep. 18-20, 2002 pp. 127-132 Digital Object Identifier 10.1109/CACSD.2002.1036941.*

A comparative analysis of photovoltaic street lighting systems installed in Thailand Hiranvarodom, S.; Photovoltaic Energy Conversion, 2003. Proceedings of 3rd World Conference on vol. 3, May 12-16, 2003 pp. 2478-2481 vol. 3 Digital Object Identifier 10.1109/WCPEC.2003.1305094.*

Photovoltaic lighting system performance Harrington, S.R.; Hund, T.D.; Photovoltaic Specialists Conference, 1996., Conference Record of the Twenty Fifth IEEE May 13-17, 1996 pp. 1307-1310 Digital Object Identifier 10.1109/PVSC.1996.564373.*

Micro controller-Based Electronic Ballast for Multiple HPS Lamps Wang Maojun; Xu Dianguo; Power Electronics and Drives Systems, 2005. PEDS 2005. International Conference on vol. 2, 28-01 Nov. 2005 pp. 844-847.*

A semiconductor lighting system controlled through a LIN network to automotive application Cervi, M.; Pappis, D.; Marchesan, T.B.; Campos, A.; do Prado, R.N.; Industry Applications Conference, 2005. Fourtieth IAS Annual Meeting. Conference Record of the 2005vol. 3, Oct. 2-6, 2005 pp. 1603-1608 vol. 3Digital Object Identifer 10.1109/IAS.*

A novel nonlinear control for stability improvement in HVDC light system Guo-Jie Li; Siye Ruan; Lin Peng; Yuanzhang Sun; Xiong Li; Power Engineering Society General Meeting, 2005. IEEE Jun. 12-16, 2005 pp. 837-845 vol. 1 Digital Object Identifier 10.1109/PES.2005. 1489221.*

Single-stage converters for PV lighting systems with MPPT and energy backup Tsai-Fu Wu; Chien-Hsuan Chang; Yong-Jing Wu; Aerospace and Electronic Systems, IEEE Transactions on vol. 35, Issue 4, Oct. 1999 pp. 1306-1317 Digital Object Identifier 10.1109/7.805447.*

A fuzzy-logic-controlled single-stage converter for PV-powered lighting system applications Tsai-Fu Wu; Chien-Hsuan Chang; Yu-Hai Chen; Industrial Electronics, IEEE Transactions on vol. 47, Issue 2, Apr. 2000 pp. 287-296 Digital Object Identifier 10.1109/41. 836344.*

Design Micro-controller Electronic Ballast for Multiple High Press Sodium Lamps Wang Maojun; Qi Guisen; 12th International Power Electronics and Motion Control Conference Aug. 2006 pp. 1743-1746 Digital Object Identifier 10.1109/EPEPEMC.2006.283110.*

Solar PV charge controller and an efficient SPRL MOSFET based sine symmetrical inverter for compact fluorescent lamp Joshi, H.V.; Power Electronics and Drive Systems, 1997. Proceedings., 1997 International Conference on vol. 1, May 26-29, 1997 pp. 150-152 vol. 1 Digital Object Identifier 10.1109/PEDS.1997.618686.*

A fuzzy logic controlled single-stage converter for PV powered lighting system applications Wu, T.-F.; Chang, C.-H.; Chen, Y.-K.; Industry Applications Conference, 1999. Thirty-Fourth IAS Annual Meeting. Conference Record of the 1999 IEEE vol. 3, Oct. 3-7, 1999 pp. 1685-1692 vol. 3 Digital Object Identifier 10.1109/IAS.1999. 805967.*

An improved digital-dimming controller for back-light module applying frequency-shift technique Chang-Hua Lin; Liang-Rui Chen; Kai-Jun Pai; Industrial Electronics Society, 2003. IECON '03. The 29th Annual Conference of the IEEE vol. 1, Nov. 2-6, 2003 pp. 496-501 vol. 1 Digital Object Identifier 10.1109/IECON.2003. 1280030.*

Field investigation of the relationship between battery size and PV system performance Stevens, J.; Kratochvil, J.; Harrington, S.; Photovoltaic Specialists Conference, 1993., Conference Record of the Twenty Third IEEE May 10-14, 1993 pp. 1163-1169 Digital Object Identifier 10.1109/PVSC.1993.346958.*

Single-stage converters for photovoltaic powered lighting systems with MPPT and charging features Wu, T.-F.; Chang, C.-H.; Liu, Z.-R.; Yu, T.-H.; Applied Power Electronics Conference and Exposition, 1998. APEC '98. Conference Proceedings 1998., Thirteenth Annual vol. 2, Feb. 15-19, 1998 pp. 1149-1155 vol. 2 Digital Object Identifier 10.1109.*

NAICC: an embedded architecture for driver assistance systems design Lauffenburger, J.P.; Petitjean, c.; Basset, M.; Perronne, J.M.; Intelligent Vehicles Symposium, 2003. Proceedings. IEEE Jun. 9-11, 2003 pp. 68-73 Digital Object Identifier 10.1109/IVS.2003. 1212885.*

Implementation of Fuzzy Logic in Daylighting Control Cziker, A.; Chindris, M.; Miron, A.; Intelligent Engineering Systems, 11th International Conference on Jun. 29-Jul. 1, 2007 pp. 195-200 Digital Object Identifier 10.1109/INES.2007.4283697.*

Adaptive Traffic Lights Using Car-to Car Communication Gradinescu, V.; Gorgorin, C.; Diaconescu, R.; Cristea, V.; Iftode, L.; Vehicular Technology Conference, 2007. VTC2007-Spring. IEEE 65th Apr. 22-25, 2007 pp. 21-25 Digital Object Identifier 10.1109/VETECS.2007.17.*

Nonlinear fluorescent systems: their impact on power quality Weinian Tan; John, V.I.; Electrical and Computer Engineering, 1994. Conference Proceedings. 1994 Canadian Conference on Sep. 25-28, 1994 pp. 144-147 vol. 1 Digital Object identifier 10.1109/CCECE. 1994. 405641.*

Performance of reliable intelligent power line communication network for digital HPS ballast remote monitor and control Xu Dianguo; Mou Yingfeng; Liu Xiaosheng; Zhang Weiqiang; Industrial Electronics Society, 2003. IECON '03. The 29th Annual Conference of the IEEE vol. 2, Nov. 2-6, 2003 pp. 1267-1271 vol. 2 Digital Object Identifier 10.1109.*

* cited by examiner

COMPUTER ASSISTED LIGHTING CONTROL SYSTEM

FIELD OF THE INVENTION

This invention relates to the field of lighting systems, devices, and methods. More particularly, this invention relates to automatic lighting control systems, devices, and methods.

BACKGROUND

To deal with lighting requirements for computer usage and other activity within offices, current lighting control systems have been developed to turn lighting on and off. Current control systems must permit both small and large groups of lights and electrical loads to be controlled based on occupant motion detection commands. However, current motion-detection type lighting control systems have a shortcoming in that they are not sensitive enough to detect subtle movements. In other words, current automatic lighting control systems are not sensitive enough to detect inconspicuous occupant activity and thus fail to effectively and efficiently control lighting systems based on micro-motion.

Occupant control and override of local lighting is becoming increasingly important. Further, lighting control systems that provide local override capability based on the location of each individual occupant are required.

SUMMARY

The present invention is directed to a computer assisted system of and method for controlling power to one or more load circuits based on the detection of computer activity at one or more host computers. Preferably, the system and method are used to control load circuit that operate, or supply power to, light fixtures, such as overhead fluorescent light fixtures in a large office or public building. However, it will be clear to one skilled in the art that the system and method of the present invention can be used in residential environments and/or to control load circuits that operate, or provide power to, any number of different types of electrical devices or appliances, such as refrigerators and heaters, as well as other computer devices.

In accordance with the system and method of the present invention, computer usage at host computers is monitored and/or detected to generate activity data. The activity data is then transmitted to a controller unit that controls power to light fixtures corresponding to the locations of the host computers.

In accordance with the embodiments of the invention, the host computers coupled by a network to a central server. The host computers send the activity data to the central server. The central server is programmed with a look-up table that correlates addresses of the host computers with locations of the host computers in a building. The central server then sends control commands to a controller unit to control power to the lights corresponding to the location of each host computer in a building.

A control unit, in accordance with the embodiments of the invention, includes relays, switches and logic circuitry suitable for receiving control commands from the central server and for controlling the power to load circuits that operate the light fixtures. The host computer, the central server and the control unit are coupled by a network using any suitable networking medium or media, including wire cables, optical cables, wireless transmitters, wireless receivers or any combination thereof.

In accordance with a preferred embodiment of the invention, computer usage is detected through use of an input device such as a keyboard, a mouse, a touch screen or any other input device that is configured to input commands into the host computer. Computer usage can also be detected by voice recognition or any program activity as, for example, when a media file is being played.

In accordance with further embodiments of the invention, the system includes sensor devices such as occupancy sensors and/or light sensors. Accordingly, when occupants are present and/or low levels of natural light are present, the sensors can provide control commands to a controller unit to keep lights on even when activity from the host computers is not detected.

In accordance with the invention, each of the host computers is configured to run a daylight control program. The daylight control program is preferably a Windows™ or PC-based program that senses activity through one or more of the input device drivers also running on the host computer and is configured to send the activity data to the central server based on the sensed activity. The daylight control program can run any number of menus to allow it to run according to the customized needs of the computer user.

DETAILED DESCRIPTION OF THE INVENTION

In accordance with the present invention, an intelligent automatic lighting control system accurately detects the presence of office and other workers and ensures that office lighting is maintained even when the workers are merely typing or performing some other task that motion detectors are ill-suited to detect. Thus, an office worker typing on a computer late at night will not have his office lights go out at an inopportune time. The system in accordance with the present invention will detect the user typing on the computer and will keep his office lights on, even when a system timer turns off the lights in other offices in which no one is working. Thus, in accordance with the present invention, lighting systems can be controlled more efficiently, and, for security and other reasons, offices can be monitored more accurately.

Features and any combination of features of the automatic lighting control methods and systems shown in the figures are used, herein, to describe and explain particular properties of the devices, systems, and methods. However, the features and combinations of the features of the automatic lighting control system shown in the figures are not intended to limit the scope of the invention.

Figure 1A:
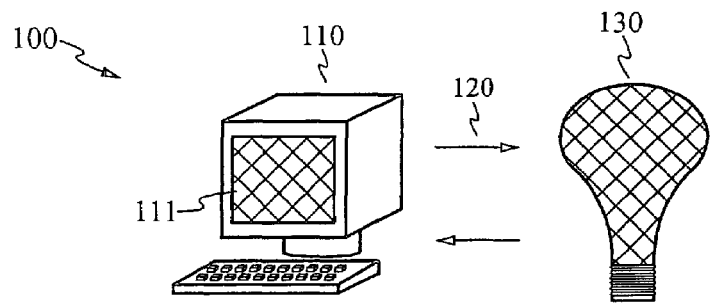
FIGS. 1A and 1B illustrate an automatic lighting control system, when computer usage is and is not detected, respectively, in accordance with one embodiment of the present invention.

FIG. 1A illustrates the components of an automatic lighting control system 100 comprising a host computer 110 electrically coupled to a lighting unit 130 by bi-directional control and data signals indicated by the pair of arrows 120. The host computer comprises a display screen 111 and a keyboard 105. The control signals 120 are transmitted from the computer 110 to the lighting unit 130, indicating that there is no usage of (i.e., no one is typing on) the keyboard 105. The control signals 120 ensure that the lighting unit 130 is not turned on if it happens to be off: the system of the current invention does not override any lighting settings, such as a timer function that turns the lighting unit 130 off at a pre-determined time. The hatched patterns on both the display screen 111 and on the lighting unit 130 indicate that both are off. As described in more detail below, the arrow in the pair 120 pointing from the host computer 110 to the lighting unit 130 indicates that data is transmitted from the host computer 110 to the lighting unit to control the lighting unit 130 in accordance with the present invention. The arrow in the pair 120 pointing from the lighting unit 130 to the host computer 110 indicates that information about the lighting unit 130 can be transmitted to the host computer 110 for display on the display screen 111 or for storing in a log file on the host computer 110.

Figure 1B:
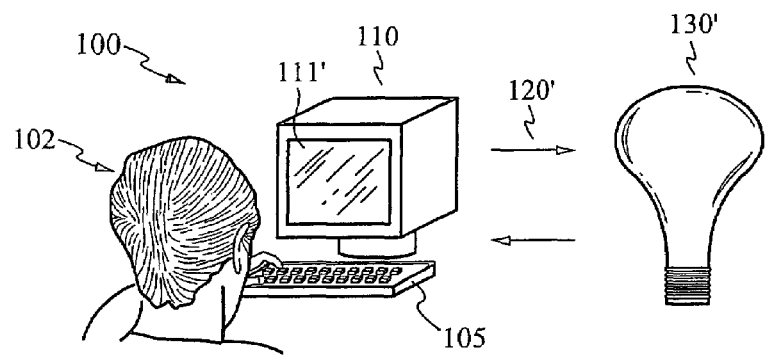

In contrast to FIG. 1A, FIG. 1B shows a user 102 typing on the keyboard 105. The system of the present invention detects the typing and transmits a control signal indicated by one of the pair of arrows 120' to the lighting unit 130 so that the lighting unit 130 (now, because it is on, renumbered 130') is on. The display screen 111 is renumbered to 111' and left unhatched, together indicating that screen 111' is displaying information in response to input on the keyboard 105. Similarly, the lighting unit 130 is renumbered to 130' and left unhatched, together indicating that, in response to input on the keyboard 105, the lighting unit 130' is on.

It will be appreciated that while FIGS. 1A and 1B illustrate a lighting unit 130 controlled in accordance with the present invention, other electrical devices (i.e., load circuits) can also be controlled. In other embodiments, for example, the lighting unit 130 is replaced by a heating, ventilation, and air conditioning (HVAC) unit; fan units; other computers; appliances; machinery; many other kinds of electrical devices; or any combination of these. It will also be appreciated that while FIGS. 1A and 1B illustrate that activity on the keyboard 105 controls the lighting unit 130, other input devices can be coupled to the host computer 110 such that activity on these other input devices also control the lighting unit 130. Device usages that will maintain the lighting system 130 on thus includes, respectively, mouse and joystick movements, accessing of a touch screen, speaking into a microphone, the use of a peripheral device operatively coupled to the computer, or any combination thereof. The peripheral device is preferably selected from the group consisting of a keyboard, a monitor, a mouse, a printer, a modem, a CD-ROM drive, a hard-drive, a USB device, or any combination thereof.

The commands controlling the output of the light source are preferably selected from the group consisting of commands to turn the light source off in response to the computer usage by the user not being detected, commands to turn the light source on in response to host computer usage by the user being detected, or any combination thereof. Preferably, before controlling the output, the user is warned of an upcoming action. An example is providing a user with a Windows® based warning of the upcoming controlling of output by having a flashing icon appear on the Windows® toolbar on the user's host computer. In one embodiment in accordance with the present invention, if no host computer usage is monitored on the host computer 110 for twelve or more minutes, controlling an output comprises initiating a warning of the impending turning off of the light. In accordance with embodiments of the invention, this warning comprises turning the light on and off (a blinking warning), and later (in one embodiment, after three minutes), the turning off of the lights. It should be understood that these warning signals and times for turning the light off are fully customizable and configurable. In one embodiment, two warnings can be given to the user before the lights are turned off. The first warning comprises an audible warning indicating that the light will be turned off in the next few minutes. The second warning comprises the blinking warning described above (i.e. the blinking of the lights to be turned off). This blinking warning could be set for a predetermined period ranging from seconds to minutes. Any movement of the mouse or press of a key keeps the light on (or turns the light back on if it has been turned off).

Figure 2A:
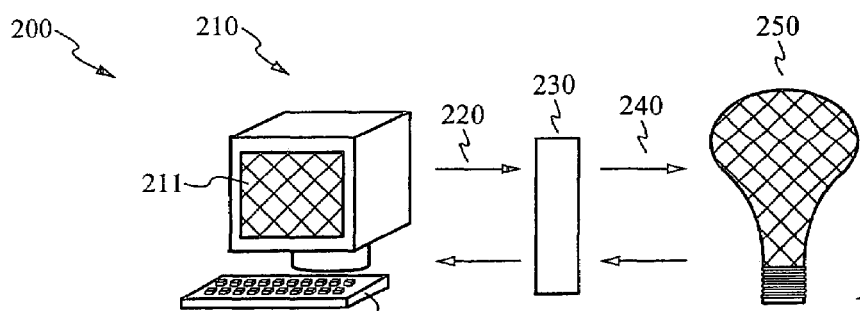
FIGS. 2A and 2B illustrate a server-based automatic lighting control system, when computer usage is and is not detected, respectively, in accordance with an embodiment of the present invention.
Figure 2B:
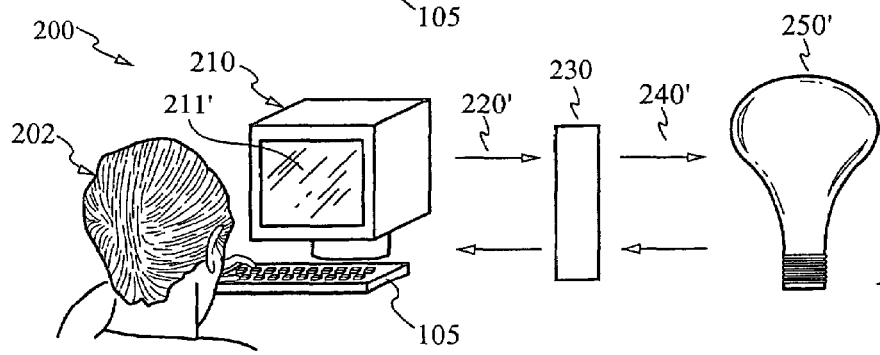

FIGS. 2A and 2B illustrate an automatic lighting control system 200 in accordance with embodiments of the invention. The automatic lighting control system 200 comprises a host computer 210 coupled to a lighting unit 250 by a central server 230. In accordance with a method of the present invention, usage of the host computer 210 by a user 202 is monitored and activity data corresponding to the usage is communicated to the central server 230. The central server 230 then modifies the output of the lighting unit 250 based on the activity data. As discussed above, the usage is selected from the group consisting of a key stroke, a mouse movement, a use of a peripheral device operatively coupled to the computer, or any combination thereof. In addition, modifying the lighting unit 250 preferably comprises an action selected from the group consisting of turning the lighting unit 250 off, turning the lighting unit 250 on, dimming the lighting unit 250, or any combination thereof.

FIG. 2A illustrates the host computer 210 not being used, and FIG. 2B illustrates the host computer 210 being used by the user 202. It should be understood that the usage of the host computer 210 is illustrated by the hash-marked screen 211, and usage of the host computer 210 being used is illustrated by the screen 211'. The hash-marked lighting unit 250 illustrates the lighting unit 250 being off and the lighting unit 250' illustrates the lighting unit being on. When the host computer 210 is not being used, as illustrated by the hash-marked screen 211, then the hash marked lighting unit 250 is off. When the host computer 210 is being used, then the lighting unit 250' is on. The communicating of the activity data is illustrated by the arrow 220 and the arrow 220', wherein the activity data is based on the monitored host computer usage by the user 202. The arrows 220 and 220' illustrate the activity data being communicated from the host computer 210 to the central server 230. Preferably, the activity data comprises data corresponding to the usage of the host computer 210 and to the location of the host computer 210. This preferably allows modifying a lighting unit at the same location as the host computer 210.

The arrows 240 and 240' illustrate communicating data from the central server 230 to the lighting unit 250. Specifically, the arrow 240 illustrates communicating data from the central server 230 to the lighting unit 250, modifying the lighting unit 250 so that the lighting unit 250 is turned off. The arrow 240' illustrates communicating data from the central server 230 to the lighting unit 250', modifying the lighting unit 250' so that the lighting unit 250 is turned on.

In another embodiment, the method of operating the system 200 further comprises communicating the data from the central server 230 to a controller unit (not shown) and communicating the data from the controller unit to the lighting unit 250. The controller unit (not shown) is configured to modify the lighting unit 250 based on the data.

Figure 3A:
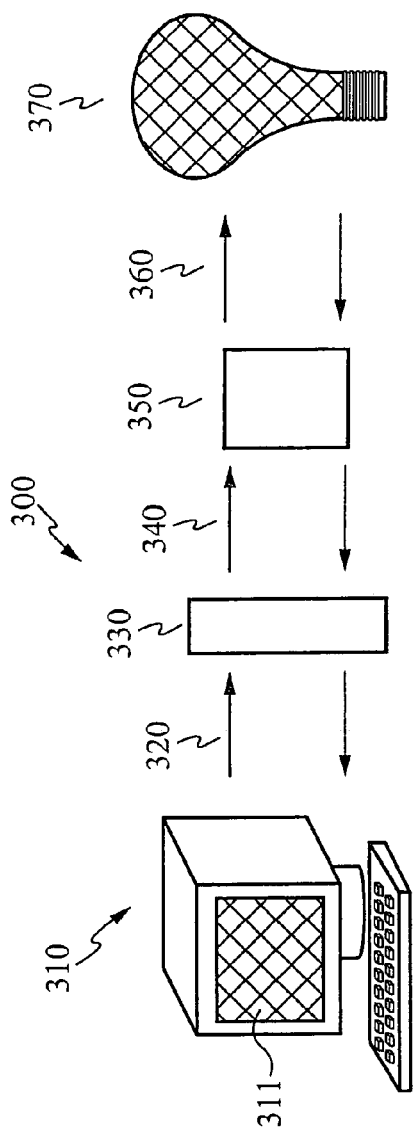
FIGS. 3A and 3B illustrate a server-based automatic lighting control system, when computer usage is and is not detected, respectively, in accordance with another embodiment of the present invention.
Figure 3B:
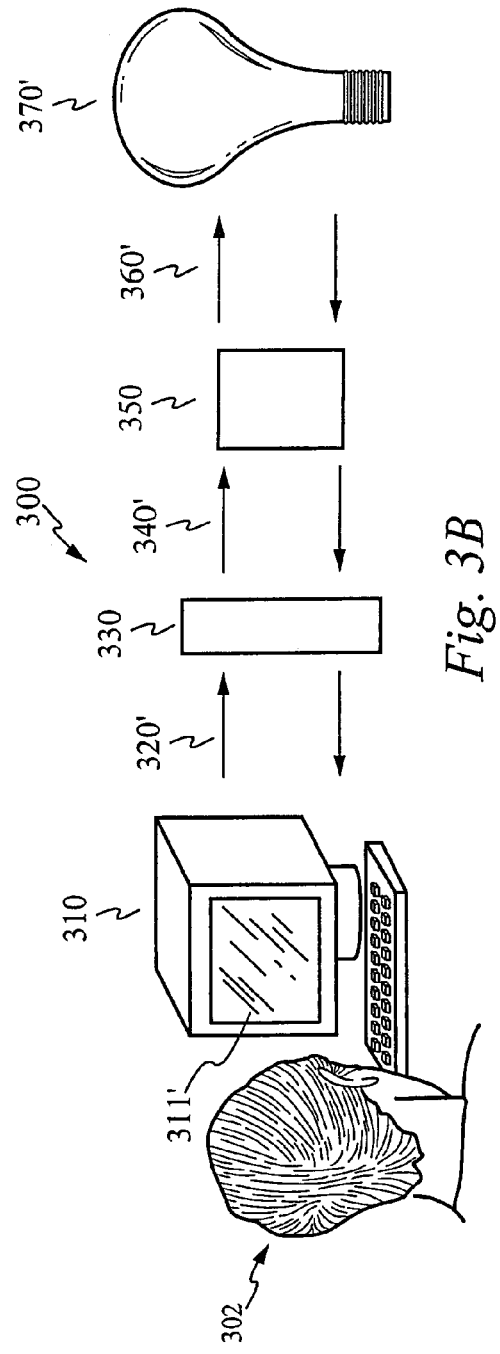

FIGS. 3A and 3B illustrate a system 300 for automatic lighting control in accordance with the present invention. The system 300 comprises a host computer 310 configured to detect usage of the host computer 310 by a user 302, a central server 330, a lighting controller unit 350, and a lighting source 370 that is controlled based on the usage of the host computer 310. In accordance with the invention, the host computer 310 is further configured to compile and transmit activity data and instructions regarding detected usage of the host computer 310, to communicate with a light source, and to control the light source. In one embodiment in accordance with the system 300, the host computer 310 comprises a Windows® interface (illustrated in FIG. 5 and discussed below). FIG. 3A illustrates the host computer 310 not being used, and FIG. 3B illustrates the host computer 310 being used by the user 302. It should be understood that the occurrence of the host computer 310 not being used is indicated by the hash-marked screen 311 and the occurrence of the host computer 310 being used is indicated by the screen 311'. The hash-marked light 370 illustrates the light being off and the light 370' illustrates the light being on. When the host computer 310 is not being used, as illustrated by the hash-marked screen 311, then the hash marked light 370 is off. When the host computer 310 is being used, then the light 370' is on.

The central server 330 is preferably configured to communicate with the host computer 310. The arrows 320 and 320' illustrate instructions being communicated from the host computer 310 to the central server 330. The central server 330 is also preferably configured to communicate instructions based on the detected usage of the host computer 310 by the user 302 to the light controller unit 350. The arrows 340 and 340' illustrate the instructions being communicated from the central server 330 to the light controller unit 350. In accordance with embodiments of the invention, the central server 330 is further configured to compile a historical activity log of the data and instructions 320 and 320' from the host computer 310, the instructions 340 and 340' from the central server 330, and the instructions 360 and 360' from the light controller unit 350. Examples of historical activity stored in the historical activity log include, but are not limited to, all "override" activity by individual users (e.g., room occupants), time of user activity, user name, and Internet Protocol (IP) address or other unique identifier of the host computer generating the activity, or any identification of the device activated. This activity log is preferably accessible by users for reviewing their own individual activity, and by an administrator for review of activity by all users. In alternative embodiments, the activity log can be accessed remotely, such as over a wide are network using the Transmission Control Protocol/Internet Protocol (TCP/IP), or over a local area network using, for example, the Ethernet protocol.

The lighting controller unit 350 is preferably configured to receive and implement the instructions from the central server 330 and to communicate instructions based on the instructions from the central server 330 to the lighting source 370.

Preferably, the communication between the host computer 310 and the components of the system 300 is conducted at intervals pre-selected by the user 302. Types of computer usage that are monitored and thereby control lights in accordance with the present invention include, but are not limited to, key strokes, mouse movements, uses of a peripheral device operatively coupled to the host computer 310, and any combination thereof. In addition, the components of the system 300 are preferably configured to communicate using means selected from the group consisting of network-based communications means such as those using a local area network (e.g., Ethernet) or a wide area network (e.g., TCP/IP), a wireless means, an infrared means, a wireless (e.g., radio) means, any hard-wired connection means, and any combination thereof.

The instructions 320 and 320' from the host computer 310, the instructions 340 and 340' from the central server 330, and the instructions 360 and 360' from the light controller unit 350 of the embodiment of the system 300 are selected from the group consisting of instructions to keep lights on if data generated by the host computer 310 indicate that the user 302 is using the host computer 310 or instructions to turn the lights off if there is the data indicate that the user 302 is not using the host computer 310. In addition, the instructions from the light controller unit 350 and the instructions from the central server 330 preferably comprise the instructions from the host computer 310. Further, the data, the instructions from the host computer 310, the instructions from the central server 330, and the instructions from the light controller unit 350 preferably comprise a user identifier (not shown) and a location address (not shown) of the host computer 310. In other embodiments, the data, the instructions from the host computer 310, the instructions from the central server 330, and the instructions from the light controller unit 350 comprise a user override instruction configured to instruct the central server 330 to maintain the lights on for a set period of time, regardless of the usage of the host computer 310 by the user 302. The user override instruction is useful when the occupant (e.g. user 302) will not be using the host computer 310, but still requires lighting. This may occur, for example, when the user 302 is reading, using the telephone, meeting with others in the office, or other times when the host computer 310 would not be used but lighting would still be required. Further, in other embodiments, the user 302 can set a maximum user override time setting so that occupants can not abuse this feature by unnecessarily keeping lights on for extensive periods.

Figure 4:
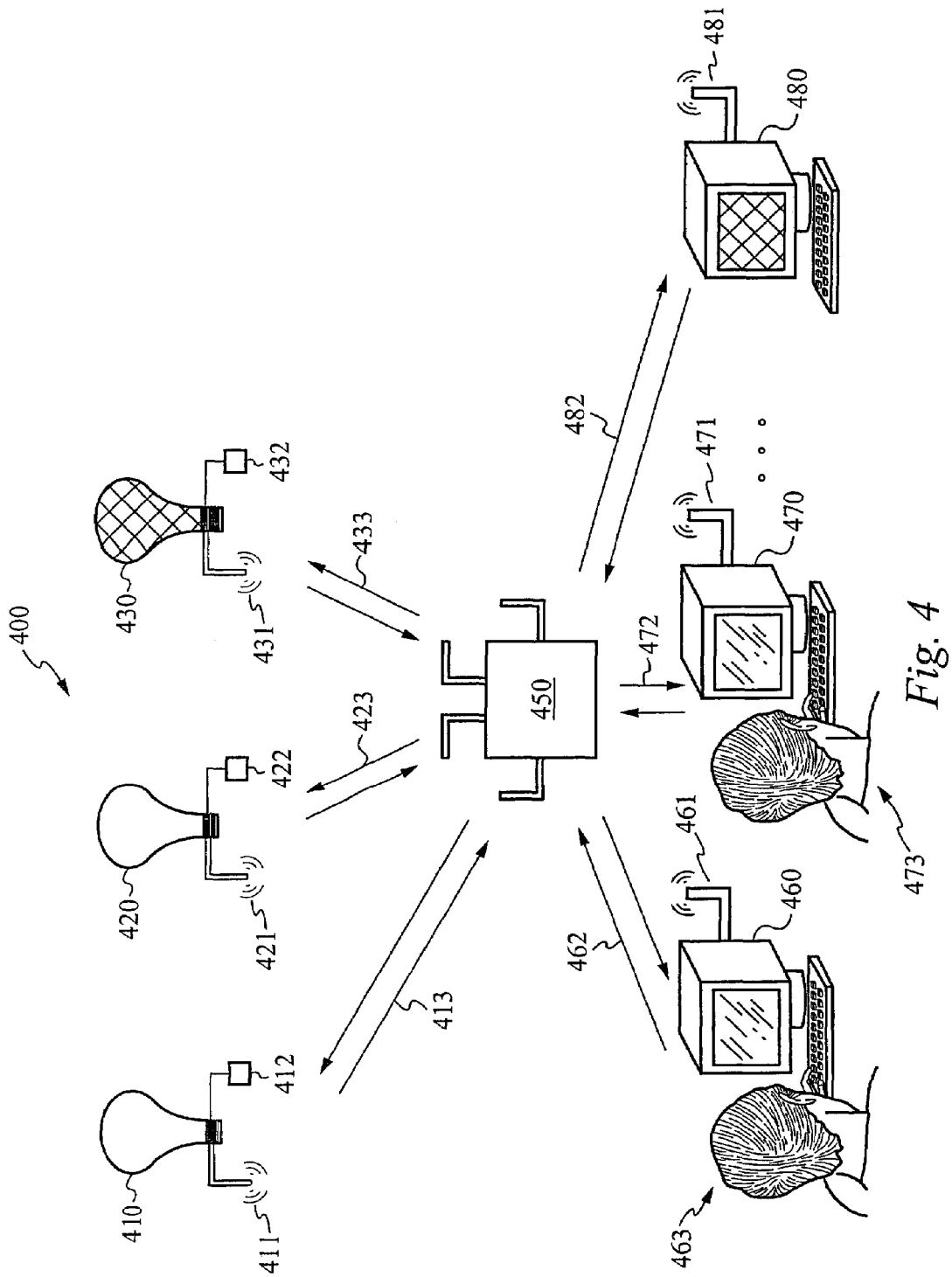
FIG. 4 illustrates an automatic lighting control system controlling a plurality of host computers, in accordance with the present invention.

FIG. 4 illustrates another embodiment of a system 400 for automatic lighting control in accordance with the present invention. The system 400 comprises a plurality of light sources 410, 420, and 430, and a plurality of receiver modules 412, 422, and 432 operatively coupled to the plurality of light sources 410, 420, and 430, respectively. It should be understood that the hashed light source 430 illustrates that the light source is off. The plurality of receiver modules 412, 422, and 432 are preferably configured to control the plurality of light sources 410, 420, and 430, respectively.

The system 400 further comprises a controller unit 450 operatively coupled to the plurality of receiver modules 412, 422, and 432. The controller unit 450 is preferably configured to communicate with and instruct the plurality of receiver modules 412, 422, and 432 and to control the plurality of light sources 410, 420, and 430. The arrows 413, 423, and 433 illustrate the communication between the controller unit 450 and the plurality of receiver modules 412, 422, and 432, respectively. In accordance with embodiments of the invention, the controller unit 450 is further configured to communicate with the plurality of receiver modules 412, 422, and 432 using any suitable networking media or medium, or a line voltage communication protocol using internal wiring within a building (not shown) housing the system 400.

The system 400 further comprises a plurality of host computers 460, 470, and 480 each comprising a corresponding signaling device 461, 471, and 481, respectively. Each of the plurality of signaling devices 461, 471, and 481 is configured to send signals to the controller unit 450 instructing the controller unit 450 to communicate with and instruct the plurality of receiver modules 412, 422, and 432, thereby controlling the plurality of light sources 410, 420, and 430 based on host computer activity of a user. The arrows 462, 472, and 482 illustrate the communication between the plurality of signaling devices 461, 471, and 481 and the controller unit 450.

For illustration purposes only, the host computer 460 is shown as being used by a user 463 (i.e., there is computer activity by a user on the computer 460), the computer 470 is shown as being used by a user 473 (i.e., there is computer activity by a user on the computer 470), and the hashed computer 480 is shown as not being used (i.e., there is no computer activity by a user on the computer 480). It should also be understood that the computer activity is selected from the group consisting of a key stroke, a mouse movement, a use of a peripheral device operatively coupled to the computer, and any combination thereof. The light source 410 is on in response to host computer activity of the user 463 on the computer 460. The light source 420 is on in response to host computer activity of the user 473 on the computer 470. However, because there is no computer activity by a user on the computer 480, the corresponding light source 430 is off because of the lack of computer activity. Preferably, the plurality of computers 460, 470, and 480 is each configured for an override option to be selected from the group consisting of a wall switch based override, a telephone based override, an Internet Protocol based override, an occupancy sensor based override, or a manual computer based override.

In one embodiment, each of the plurality of light sources 410, 420, and 430 is powered by a load (not shown). In another embodiment, each of the plurality of light sources 410, 420, and 430 comprises a lamp (not shown), a ballast (not shown), and a lighting fixture (not shown). Preferably, each of the plurality of light sources 410, 420, and 430 comprises a multiple light output source lighting fixture (not shown), and the controller unit 450 is further configured to control one or more of the light output sources of the multiple light output source lighting fixture (not shown). It should also be understood that the system 400 automatically keeps lights on for occupants, even when a relay (not shown) is shared with other offices where computer usage by users has not been detected, based on most recent host computer activity. In accordance with embodiments of the invention, each of the light sources 410, 420, and 430 further comprises a signaling device 411, 421, and 431 operatively coupled to each of the plurality of light sources 410, 420, and 430, respectively. These signaling devices 411, 421, and 431 are configured to communicate with the components of the system 400.

Figure 5:
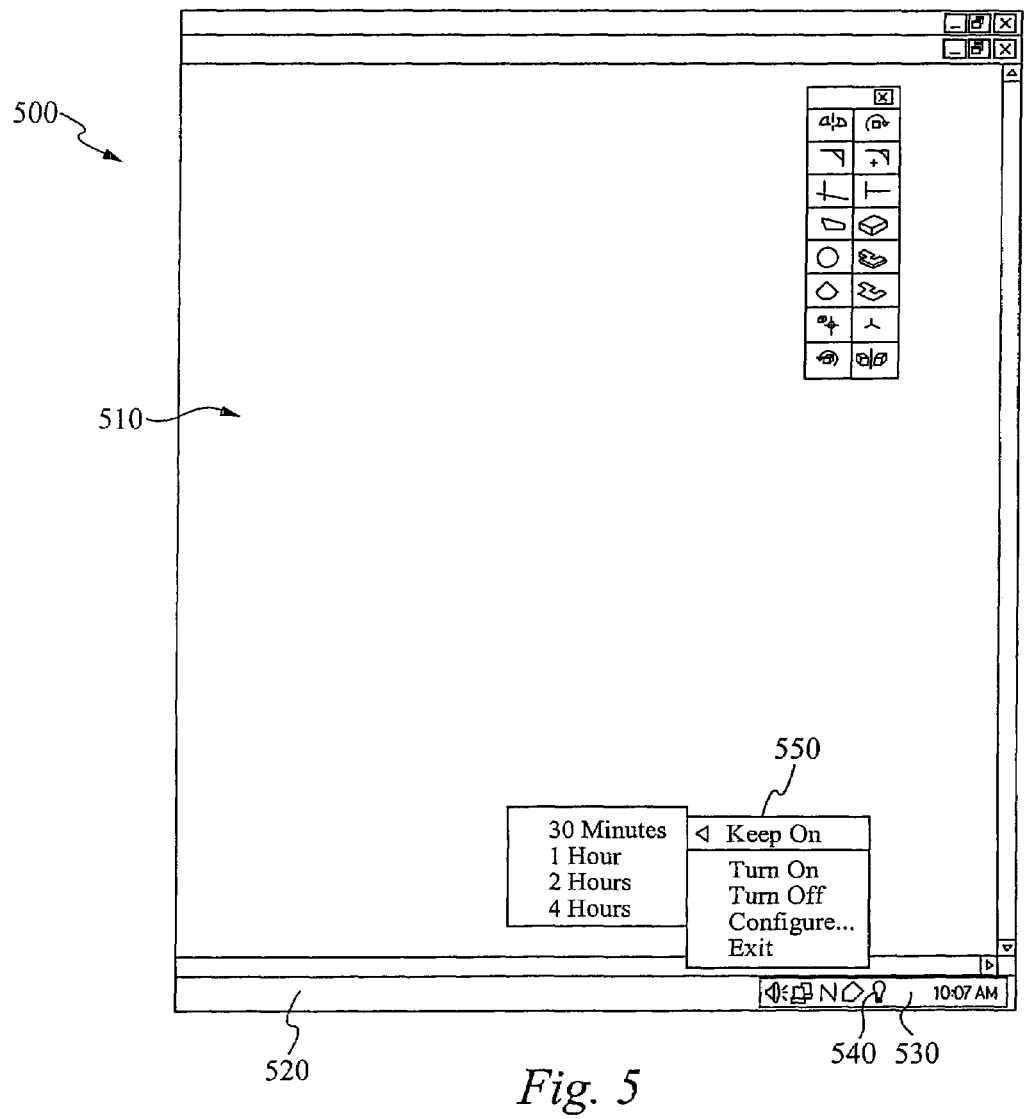
FIG. 5 illustrates a user interface for accessing and controlling an automatic lighting control system, in accordance with the present invention.

As stated above, in the embodiment of the system 300 shown in FIGS. 3A-B, the host computer 310 comprises a user interface. FIG. 5 illustrates a preferred embodiment of a user interface 500 used in conjunction with the automatic lighting control systems and methods described above. The user interface 500 preferably comprises a Windows® type of interface and associated software. The user interface 500 further comprises a work area 510, a taskbar 520, and a taskbar icon area 530. The icon area 530 preferably comprises a light bulb icon 540. The Windows® interface allows the computer (not shown) to be customized and controlled by the user, preferably through the light bulb icon 540. The Windows® interface 500 preferably further comprises associated software that is preferably pre-installed on the computer. In other embodiments, the Windows® interface 500 comprises associated software that is installed from an internal network or from a remote network using, for example, TCP/IP, on demand by a user. In accordance with embodiments of the invention, the user interface 500 comprises an alternative icon-based interface and associated software, a graphical user based interface, a command-line interface (e.g., using a UNIX- or Linux-based operating system), or any combination thereof.

The user interface 500 is now used to illustrate how the user interface 500 can be used so that a user can override pre-set lighting commands (e.g., timer shut off) to have meetings, make phone calls, or perform other non-PC intensive tasks. In a Windows® based user interface system, a user would perform the necessary number of mouse clicks on the light bulb task bar icon 540, thereby opening a pop-up window 550. The pop-up window 550 provides the user with options to override the automatic lighting control systems described above. The override preferably comprises options to turn the lights off, turn the lights on, or keep the lights on for a predetermined interval (e.g. one, two, or more hours). In accordance with embodiments of the invention, a user can configure and customize the override options. In other embodiments, all override option settings are predefined and configured at a central location (by the system administrator, or via a web page, for example) and stored in a configuration file or database.

The benefits of the current device, system and method include, but are not limited to: saving energy and money by turning lights off based on computer usage; allowing an occupant to override the automatic lighting control system based on specific needs; providing efficient and effective automatic lighting control in an open office area where a single relay is shared by the open office area and individual offices; achieving energy and money savings by eliminating "false off" generations with computer-intensive users and other uses with movements that are inconspicuous to automatic lighting control systems; offering a customizable and efficient manner to sense occupancy for minimal cost; and providing a system that fits seamlessly in a networked lighting environment such as one containing computers, servers, and other lighting controllers.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiments chosen for illustration without departing from the spirit and scope of the invention. Therefore, it is understood that the present invention could be implemented in several different ways and have several different appearances.

What is claimed is:

1. A method of automatically controlling a load circuit comprising:
   a) monitoring usage of a host computer by a user present at a location corresponding to the host computer to generate usage data from the host computer;
   b) transmitting the usage data to a controller unit; and
   c) controlling an output of the load circuit corresponding to the location of the host computer with the controller unit based on the usage data generated from the host computer.

2. The method of claim 1, wherein the load circuit controls a light corresponding to the location of the host computer.

3. The method of claim 1, wherein the usage data is generated by an activity performed on the host computer, the activity selected from the group consisting of a key stroke, a mouse movement, a use of a peripheral device operatively coupled to the host computer, and any combination thereof.

4. The method of claim 2, wherein the step of controlling causes one or more of flashing the light on and off, turning the light off, turning the light on and dimming the light.

5. A method of automatic lighting control comprising:
   a) communicating activity data generated from user activity on a host computer at a location of the host computer and transmitted to a central server at a location of the central server; and b) operating a controller unit from the central server to control lights at or near the location of the host computer based on the activity data generated on the host computer.

6. The method of claim 5, wherein the activity data is generated by one or more activity is performed on the host computer, the one or more activities being selected from the group consisting of a key stroke, a mouse movement and a use of a peripheral device operatively coupled to the host computer.

7. The method of claim 5, wherein the step of operating a controller unit from the central server to control lights causes the lights to turn on, turn off or dim.

8. A method of automatic lighting control comprising:
   a) monitoring a level of usage of a host computer by a user from the host computer to generate activity data;
   b) transmitting the activity data to a controller unit coupled to a load circuit that controls light output corresponding to a location of the host computer; and
   c) controlling the light output from the controller unit based on the activity data generated from the host computer.

9. The method of claim 8, wherein monitoring a level of usage of a host computer comprises monitoring one or more of key strokes from the host computer, mouse movements from the host computer and usage of a peripheral device operatively coupled to the host computer.

10. The method of claim 9, wherein the peripheral device is selected from the group consisting of a keyboard, a monitor, a mouse, a printer, a modem, a CD-rom drive, a hard-drive, a USB device, a joystick, a touch screen, and any combination thereof.

11. The method of claim 8, wherein controlling the light output form the controller unit based on the activity data comprises reducing the light output when the a level of usage is below a threshold level and increasing the light output when the a level of usage is above the threshold level.

12. A system for automatic lighting control, the system comprising:
   a) a host computer configured to detect a user's usage of the host computer while the users is present at the host computer;
   b) a controller in communication with the host computer; and
   c) software loaded on host computer and configured to compile and transmit activity data to the controller based on the user's usage of the host computer, wherein the controller is configured to control a light source at the host computer based on the transmitted activity data.

13. The system of claim 12, wherein the data is transmitted to the controller at intervals pre-selected by the user.

14. The system of claim 12, wherein the user's usage of the host computer is selected from the group consisting of a key stroke, a mouse movement, a use of a peripheral device operatively coupled to the host computer, and any combination thereof.

15. The system of claim 12, wherein the activity data is transmitted to the controller by one or more of an Internet Protocol means, a wireless means, an infrared means, a radio means, an Ethernet network connection means and a hard wire connection means.

16. The system of claim 12, wherein the activity data comprises a user identifier and a location of the host computer.

17. The system of claim 12, wherein the activity data comprises a user override instruction configured to instruct the central server to maintain the light source on for a set period of time, regardless of the user's usage of the host computer.

18. The system of claim 12, wherein the host computer comprises a Windows® interface.

19. The system of claim 12, wherein the host computer comprises a Windows® based computer icon software.

20. The system of claim 12, wherein the host computer comprises a UNIX interface.

21. The system of claim 12, wherein the host computer comprises a graphical user interface.

22. The system of claim 12, wherein the system further comprises a central server and wherein the activity data is transmitted to the controller through the central server.

23. The system of claim 22, wherein the central server is further configured to compile a historical activity log of the activity data.

24. A system for automatic lighting control comprising:
   a) a plurality of light sources at a plurality of locations;
   b) a controller unit configured to communicate with and to control light outputs from the plurality of light sources; and
   c) a plurality of host computers at the plurality of locations each configured to send signals to the controller unit, wherein the signals instruct the controller unit to control the light outputs from the plurality of light sources at each of the plurality of locations based on a level of usage from each of the plurality of host computers at each of the locations.

25. The system of claim 24, wherein the system further comprises a plurality of receiver modules operatively coupled to the plurality of light sources, wherein the plurality of receiver modules are configured to receive control commands from the controller unit and to thereby control the light outputs from the plurality of light sources.

26. The system of claim 25, wherein each of the plurality of host computers include a signaling device to send the signals to the controller unit.

27. The system of claim 24, wherein each of the plurality of light sources is powered by a load and wherein the controller unit is configured to directly control the load.

28. The system of claim 24, wherein each of the plurality of light sources comprises a lamp, a ballast, and a lighting fixture.

29. The system of claim 24, wherein each of the plurality of light sources comprises a multiple light output source lighting fixture.

30. The system of claim 29, wherein the controller unit is further configured to control a multiple light output source lighting fixture of the one or more of the light output sources.

31. The system of claim 25, wherein the controller unit transmits the control commands to the plurality of receiver modules via a line voltage communication protocol.

32. The system of claim 24, wherein the plurality of host computers are each configured for an override option to prevent the controller unit from controlling at least a portion of the light outputs from the plurality of light sources, wherein the override option is selected from the group consisting of a wall switch based override, a telephone based override, an Internet Protocol based override, an occupancy sensor based override, and a manual computer based override.

33. The system of claim 24, wherein the level of usage from each of the plurality of host computers include monitoring one or more of key strokes, a mouse, usage of a peripheral device operatively coupled to one or more of the host computers, and any combination thereof.

* * * * *